United States Patent
Tang et al.

(10) Patent No.: US 11,283,553 B2
(45) Date of Patent: Mar. 22, 2022

(54) METHOD AND APPARATUS FOR DATA PROCESSING USING HYBRID AUTOMATIC REPEAT REQUEST (HARQ) PROCESSES

(71) Applicant: HUAWEI TECHNOLOGIES CO., LTD., Guangdong (CN)

(72) Inventors: Hao Tang, Shanghai (CN); Jinlin Peng, Shanghai (CN); Pengpeng Dong, Shanghai (CN); Zhenfei Tang, Ottawa (CA)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/552,366

(22) Filed: Aug. 27, 2019

(65) Prior Publication Data

US 2019/0386784 A1 Dec. 19, 2019

Related U.S. Application Data

(63) Continuation of application No. PCT/CN2018/076993, filed on Feb. 23, 2018.

(30) Foreign Application Priority Data

Feb. 28, 2017 (CN) .......................... 201710114335.X

(51) Int. Cl.
*H04L 1/18* (2006.01)
*H04W 76/11* (2018.01)
(Continued)

(52) U.S. Cl.
CPC .......... *H04L 1/1819* (2013.01); *H04L 1/0004* (2013.01); *H04W 72/0453* (2013.01); *H04W 76/11* (2018.02)

(58) Field of Classification Search
CPC ... H04L 1/1819; H04L 1/0004; H04L 1/0025; H04L 1/1864; H04L 1/1893;
(Continued)

(56) References Cited

U.S. PATENT DOCUMENTS

2011/0019776 A1  1/2011 Zhang et al.
2014/0086113 A1* 3/2014 Ji ........................ H04L 1/1896
                                                          370/280
(Continued)

FOREIGN PATENT DOCUMENTS

CN   101990242 A   3/2011
CN   102045766 A   5/2011
(Continued)

OTHER PUBLICATIONS

WO 2017136678 A1 (Year: 2017).*
(Continued)

*Primary Examiner* — Ian N Moore
*Assistant Examiner* — Rushil Parimal Sampat
(74) *Attorney, Agent, or Firm* — Womble Bond Dickinson (US) LLP

(57) ABSTRACT

Embodiments of this application provide a data processing method and apparatus. The method includes: receiving, by a first device, control information, where the control information includes information about a first resource and information about a HARQ process; receiving, by the first device on a second resource, data associated with the control information; and placing the data into a buffer of a HARQ process of a HARQ entity associated with the first resource. The associated data is sent on the plurality of resources. The initially transmitted data and the retransmitted data are stored in the buffer of the specified process of the specified HARQ entity according to an indication of the control information, to improve a decoding success rate.

12 Claims, 5 Drawing Sheets

(51) Int. Cl.
*H04L 1/00* (2006.01)
*H04W 72/04* (2009.01)

(58) Field of Classification Search
CPC ....... H04L 1/1822; H04L 5/00; H04L 1/0027; H04L 1/1812; H04L 1/1835; H04L 5/0055; H04W 76/11; H04W 72/0453
See application file for complete search history.

(56) References Cited

U.S. PATENT DOCUMENTS

| | | | |
|---|---|---|---|
| 2014/0211732 A1* | 7/2014 | Nogami | H04L 5/0053 370/329 |
| 2015/0271693 A1* | 9/2015 | Kang | H04W 24/02 370/252 |
| 2016/0165593 A1* | 6/2016 | Wengerter | H04L 1/1896 370/329 |
| 2016/0234820 A1* | 8/2016 | Mallik | H04W 72/0406 |
| 2017/0373800 A1* | 12/2017 | Lee | H04L 1/1893 |
| 2018/0192442 A1* | 7/2018 | Li | H04L 5/0048 |
| 2019/0036640 A1* | 1/2019 | Xu | H04L 1/0009 |
| 2019/0068334 A1* | 2/2019 | Stern-Berkowitz | H04L 1/1812 |

FOREIGN PATENT DOCUMENTS

| | | |
|---|---|---|
| CN | 102088433 A | 6/2011 |
| CN | 102223728 A | 10/2011 |
| CN | 102316526 A | 1/2012 |
| CN | 106301733 A | 1/2017 |
| EP | 2688349 B1 | 6/2016 |
| WO | 2018058679 A1 | 4/2018 |

OTHER PUBLICATIONS

3GPP TSG RAN WG1 Meeting #77,R1-142564,:"TP on cross carrier scheduling for CZ-UMTS carrier aggregation", Huawei, HiSilicon, May 19-23, 2014,total 3 pages.
Nokia et al, HARQ Pooling for Carrier Aggregation in NR. 3GPP TSG-RAN WG1 Meeting #87 Reno, Nevada, USA, Nov. 14-18, 2016, R1-1612245, 5 pages.

* cited by examiner

METHOD AND APPARATUS FOR DATA PROCESSING USING HYBRID AUTOMATIC REPEAT REQUEST (HARQ) PROCESSES

CROSS-REFERENCE TO RELATED APPLICATIONS

This application is a continuation of International Application No. PCT/CN2018/076993, filed on Feb. 23, 2018, which claims priority to Chinese Patent Application No. 201710114335.X, filed on Feb. 28, 2017. The disclosures of the aforementioned applications are hereby incorporated by reference in their entireties.

TECHNICAL FIELD

This application relates to wireless communication technologies, and in particular, to a data processing method and apparatus.

BACKGROUND

In long term evolution (LTE), a hybrid automatic repeat request (HARQ) entity exists at a media access control (MAC) layer. When data is sent, the MAC layer multiplexes a logical channel and a control unit to form a corresponding transport block (TB), and then transfers the corresponding TB block to the HARQ entity. The HARQ entity allocates HARQ information and the TB to a corresponding HARQ process. Each HARQ entity includes a plurality of parallel HARQ processes, and each HARQ process has one HARQ process number. In addition, each HARQ process has one corresponding HARQ buffer, and a received packet is stored in one HARQ buffer, and is combined with a subsequently received retransmitted packet, to obtain a packet more reliable than that obtained through separate decoding.

As a quantity of smart terminal users constantly increases, a service volume and a data throughput of the users constantly increase, posing a higher requirement on a communication rate. However, radio spectrum resources are in shortage, and it is difficult to find continuous large bandwidth for mobile communication. Therefore, a carrier aggregation (CA) technology is introduced into the LTE to aggregate a plurality of continuous or discontinuous spectrums for use, technically meeting a large-bandwidth requirement of the mobile communication, and improving utilization of a scattered spectrum on a radio frequency band. More spectrum resources may be used in 5G for example, a 3.5 GHz band spectrum and a high-frequency spectrum above 6 GHz. To support a continuous large-bandwidth spectrum in 5G one carrier may be divided into a plurality of sub-bands. Each sub-band has an independent resource scheduling process and an independent HARQ process, and aggregating a plurality of sub-bands enables a user equipment (UE) to support a large-bandwidth carrier.

However, in a carrier aggregation scenario or a sub-band aggregation scenario, how to improve a decoding rate is a problem that needs to be resolved.

SUMMARY

Embodiments of this application provide a data processing method and apparatus, to improve a decoding rate in a carrier aggregation or sub-band aggregation scenario.

A first aspect of this application provides a data processing method, including:

receiving, by a first device, control information, where the control information includes information about a first resource and information about a HARQ process; and sending, by the first device on a second resource, data of the HARQ process associated with the first resource.

A second aspect of this application provides a data processing method, including:

receiving, by a first device, control information, where the control information includes information about a first resource and information about a HARQ process;

receiving, by the first device on a second resource, data associated with the control information; and placing, by the first device, the data into a buffer of a HARQ process of a HARQ entity associated with the first resource.

A third aspect of this application provides a data processing method, including:

generating, by a second device, control information, where the control information includes information about a first resource and information about a HARQ process; and sending, by the second device, the control information.

In one embodiment, the second device sends, on the second resource, data associated with the control information.

A fourth aspect of this application provides a data processing method, including:

sending, by a second device, control information, where the control information includes information about a first resource and information about a HARQ process; and receiving, by the second device on a second resource, data of the HARQ process associated with the first resource.

Based on the first aspect to the fourth aspect, details are as follows:

In one embodiment, the information about the first resource is an identifier of a HARQ entity associated with the first resource.

In one embodiment, the information about the first resource is an identifier of the first resource.

In one embodiment, the control information includes a modulation scheme field, and the modulation scheme field is used to indicate the information about the first resource.

In one embodiment, the control information includes an initial transmission/retransmission indication identifier, and the initial transmission/retransmission indication identifier is used to indicate whether currently transmitted data is retransmitted data or initially transmitted data.

When the initial transmission/retransmission indication identifier indicates that the currently transmitted data is the retransmitted data, the modulation scheme field indicates the first resource by using a mapping relationship between a modulation scheme and a resource.

In one embodiment, when the second resource is a scheduling carrier, the first resource is one of a plurality of scheduled carriers.

In one embodiment, when the second resource is a scheduled carrier, the first resource is a scheduling carrier.

In one embodiment, a quantity of the plurality of scheduled carriers is $\min\{N_1, N_2, L, N_i, L, N_k\}$, the modulation scheme field includes $N_i$ values to indicate a modulation order $M_i$, k is an integer greater than 0, $1 \le i \le k$, i is an integer, and both $N_i$ and $M_i$ are integers greater than 0.

A fifth aspect of this application provides a data processing apparatus, where the apparatus includes a module or a means configured to perform the method according to the first aspect and the implementations of the first aspect.

A sixth aspect of this application provides a data processing apparatus, where the apparatus includes a module or a means configured to perform the method according to the second aspect and the implementations of the second aspect.

A seventh aspect of this application provides a data processing apparatus, where the apparatus includes a module or a means configured to perform the method according to the third aspect and the implementations of the third aspect.

An eighth aspect of this application provides a data processing apparatus, where the apparatus includes a module or a means configured to perform the method according to the fourth aspect and the implementations of the fourth aspect.

A ninth aspect of this application provides a data processing apparatus, where the apparatus includes a processor and a memory, the memory is configured to store a program, and the processor invokes the program stored in the memory, to perform the method provided in the first aspect of this application.

A tenth aspect of this application provides a data processing apparatus, where the apparatus includes a processor and a memory, the memory is configured to store a program, and the processor invokes the program stored in the memory, to perform the method provided in the second aspect of this application.

An eleventh aspect of this application provides a data processing apparatus, where the apparatus includes a processor and a memory, the memory is configured to store a program, and the processor invokes the program stored in the memory, to perform the method provided in the third aspect of this application.

A twelfth aspect of this application provides a data processing apparatus, where the apparatus includes a processor and a memory, the memory is configured to store a program, and the processor invokes the program stored in the memory, to perform the method provided in the fourth aspect of this application.

A thirteenth aspect of this application provides a data processing apparatus, including at least one processing element (or chip) configured to perform the method according to the first aspect.

A fourteenth aspect of this application provides a data processing apparatus, including at least one processing element (or chip) configured to perform the method according to the second aspect.

A fifteenth aspect of this application provides a data processing apparatus, including at least one processing element (or chip) configured to perform the method according to the third aspect.

A sixteenth aspect of this application provides a data processing apparatus, including at least one processing element (or chip) configured to perform the method according to the fourth aspect.

A seventeenth aspect of this application provides a program, where when being executed by a processor, the program is used to perform the method according to the first aspect.

An eighteenth aspect of this application provides a program product, for example, a computer readable storage medium, including the program according to the seventeenth aspect.

A nineteenth aspect of this application provides a program, where when being executed by a processor, the program is used to perform the method according to the second aspect.

A twentieth aspect of this application provides a program product, for example, a computer readable storage medium, including the program according to the nineteenth aspect.

A twenty-first aspect of this application provides a program, where when being executed by a processor, the program is used to perform the method according to the third aspect.

A twenty-second aspect of this application provides a program product, for example, a computer readable storage medium, including the program according to the twenty-first aspect.

A twenty-third aspect of this application provides a program, where when being executed by a processor, the program is used to perform the method according to the fourth aspect.

A twenty-fourth aspect of this application provides a program product, for example, a computer readable storage medium, including the program according to the twenty-third aspect.

A twenty-fifth aspect of this application provides a data processing apparatus, including a processor, configured to: be coupled to a memory, read an instruction in the memory, and execute the instruction to implement the method according to any one of the foregoing aspects. In one embodiment, the apparatus may further include the memory. In one embodiment, the data processing apparatus may be an integrated circuit, a chip system, or a chip.

In the foregoing aspects, the associated data is sent on the plurality of resources. For example, the initially transmitted data and the retransmitted data are stored in the buffer of the specified process of the specified HARQ entity by using an indication of the control information, to implement combination and improve a decoding success rate. For example, when data is retransmitted by using a low frequency assisted with a high frequency, a low-frequency retransmitted packet and a high-frequency initially transmitted packet may be placed into a buffer of a same HARQ process, to implement soft combination.

DESCRIPTION OF EMBODIMENTS

In the following, some terms in this application are described, so as to help persons skilled in the art have a better understanding.

A base station, also referred to as a radio access network (RAN) device, is a device that connects a terminal to a wireless network. The base station may be a base transceiver station (BTS) in global system for mobile communications (GSM) or code division multiple access (CDMA); or may be a NodeB (NB) in wideband code division multiple access (WCDMA); or may further be an evolved NodeB (eNB or eNodeB) in long term evolution (LTE), a relay station or an access point, a gNB in a future 5G network, or the like. This is not limited herein.

A terminal may be a wireless terminal or a wired terminal. The wireless terminal may be a device that provides a user with voice and/or other service data connectivity, a handheld device having a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) and a computer having a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile console (Mobile), a remote station, a remote terminal, an access terminal, a user terminal, a user agent, or a user device (User Equipment). This is not limited herein.

"A plurality of" in this application refers to two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
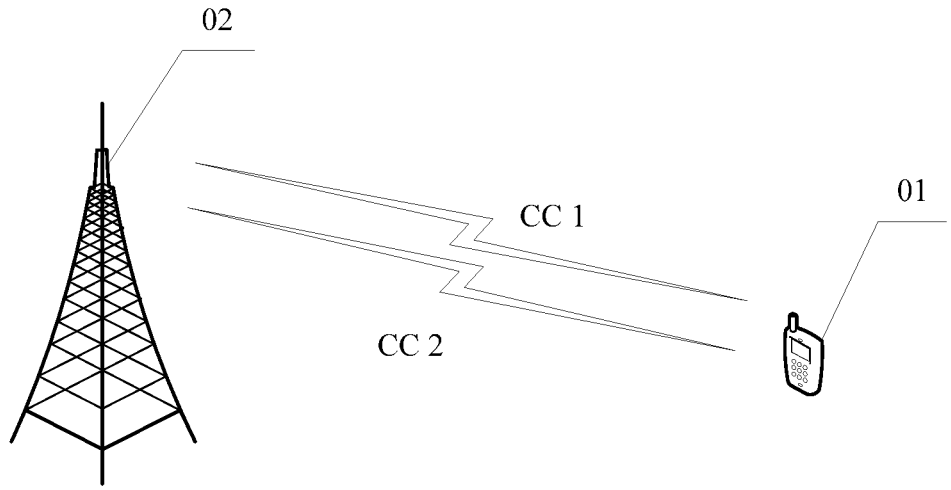
FIG. 1 is a framework diagram of a communications system.

FIG. 1 is a framework diagram of a communications system. As shown in FIG. 1, the communications system includes a first device 01 and a second device 02.

The first device communicates with the second device based on resource aggregation. The resource aggregation herein may be carrier aggregation, sub-band aggregation, or the like. This is not limited herein.

In different application scenarios, the first device and the second device may be different device combinations. For example, the first device is a terminal and the second device is a base station. For another example, the first device is a small cell and the second device is a macro cell. This is not limited herein.

Each HARQ entity includes a plurality of parallel HARQ processes and each HARQ process has one HARQ process number. In addition, each HARQ process has one corresponding HARQ buffer, and a received packet is stored in the HARQ buffer, and is combined with a subsequently received retransmitted packet. In other words, subsequently retransmitted data is also placed into the same HARQ buffer. This application provides a method for indicating, after resource aggregation is introduced, a HARQ buffer to which the retransmitted data is placed.

Figure 2:
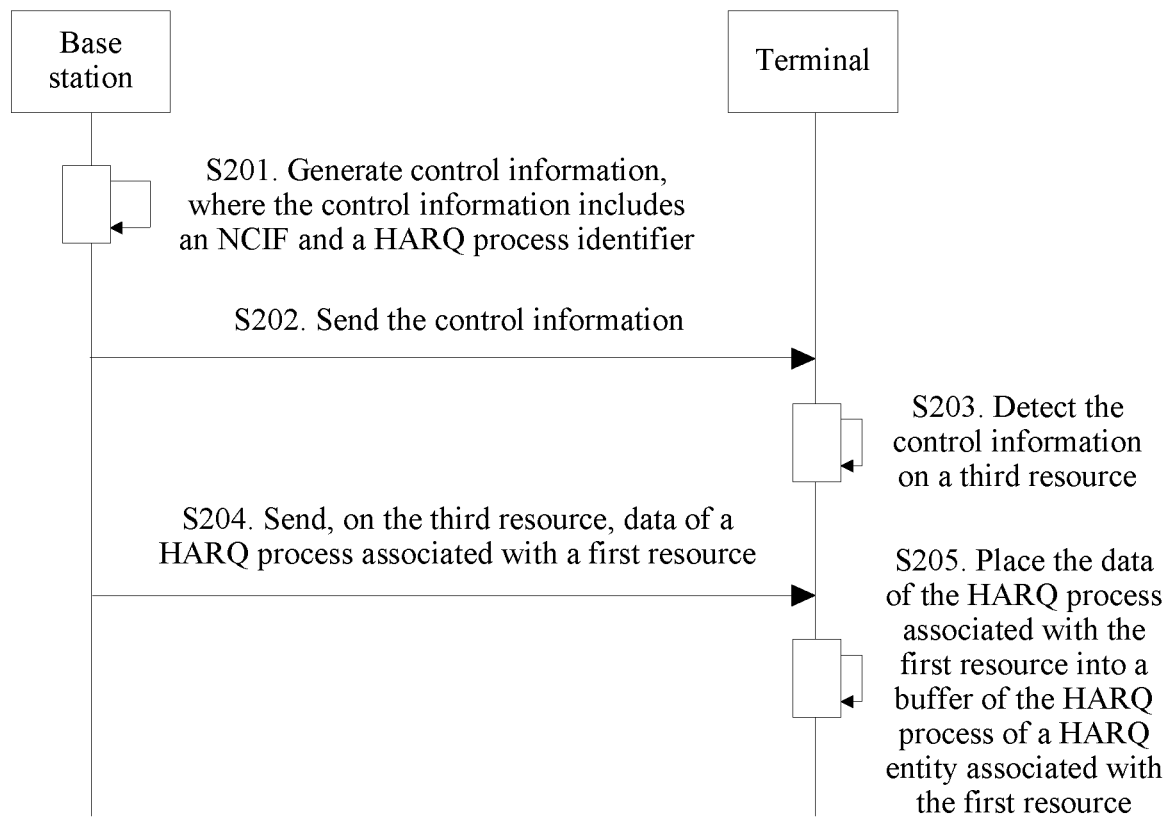
FIG. 2 is a schematic flowchart of a data processing method according to an embodiment of this application.

FIG. 2 is a schematic flowchart of a data processing method according to an embodiment of this application. That the first device is a terminal and the second device is a base station is used as an example. As shown in FIG. 2, the method includes the following operations.

Operation S201. A base station generates control information, where the control information includes a new carrier indicator field (NCIF) and a HARQ process identifier (ID).

The new carrier indicator field is used to indicate information about a first resource and information about a HARQ process. In one embodiment, the NCIF carries an identifier of the HARQ entity associated with the first resource or an identifier of the first resource. If the NCIF carries the identifier of the first resource, because each resource has a unique corresponding HARQ entity, the terminal may determine, based on the identifier of the first resource, the HARQ entity associated with the first resource.

The first resource may be a carrier, a sub-band in the carrier, or the like. This is not limited in this application. One carrier may be divided into a plurality of sub-bands. When the first resource is a sub-band, each sub-band may have its own HARQ entity. In this embodiment, an example in which the first resource is a carrier is used for description. In one embodiment, the identifier of the first resource may be an identifier of the carrier, an identifier of the sub-band, or the like depending on an actual situation.

That NCIF=x and ID=y indicates that current data transmission is managed by a HARQ entity associated with a carrier x, and data is decoded or combined in a HARQ process y of the HARQ entity associated with the carrier x. In other words, the terminal places data into a buffer of the HARQ process y of the HARQ entity associated with the carrier x.

Operation S202. The base station sends the control information.

In one embodiment, the base station broadcasts the control information. Alternatively, the base station sends the control information to the terminal through unicast.

Operation S203. The terminal detects the control information on a second resource.

Operation S204. The base station sends, on a third resource, data of the HARQ process associated with the first resource.

Correspondingly, the terminal receives, on the third resource, the data of the HARQ process associated with the first resource.

The second resource and the third resource may be a same resource, or may not be a same resource. For example, if cross-carrier scheduling is performed, the second resource and the third resource are not the same resource, and the terminal may receive the control information on the second resource, and receive the data on the third resource.

Operation S205. The terminal places the data of the HARQ process associated with the first resource into the buffer of the HARQ process of the HARQ entity associated with the first resource.

The terminal may detect the control information on the second resource, and further store the data of the HARQ process associated with the first resource in a buffer of a specific HARQ process of a HARQ entity indicated in the control information. In other words, soft combination of the data is completed in a specified process.

In this embodiment, associated data is sent on a plurality of resources. For example, the initially transmitted data and the retransmitted data are combined in the buffer of the specified process of the specified HARQ entity according to an indication of the control information, to implement combination and improve a decoding success rate. For example, when data is retransmitted by using a low frequency assisted with a high frequency, a low-frequency retransmitted packet and a high-frequency initially transmitted packet may be placed into a buffer of a same HARQ process, to implement the soft combination.

In one embodiment, the control information may be downlink control information (DCI).

Figure 3:
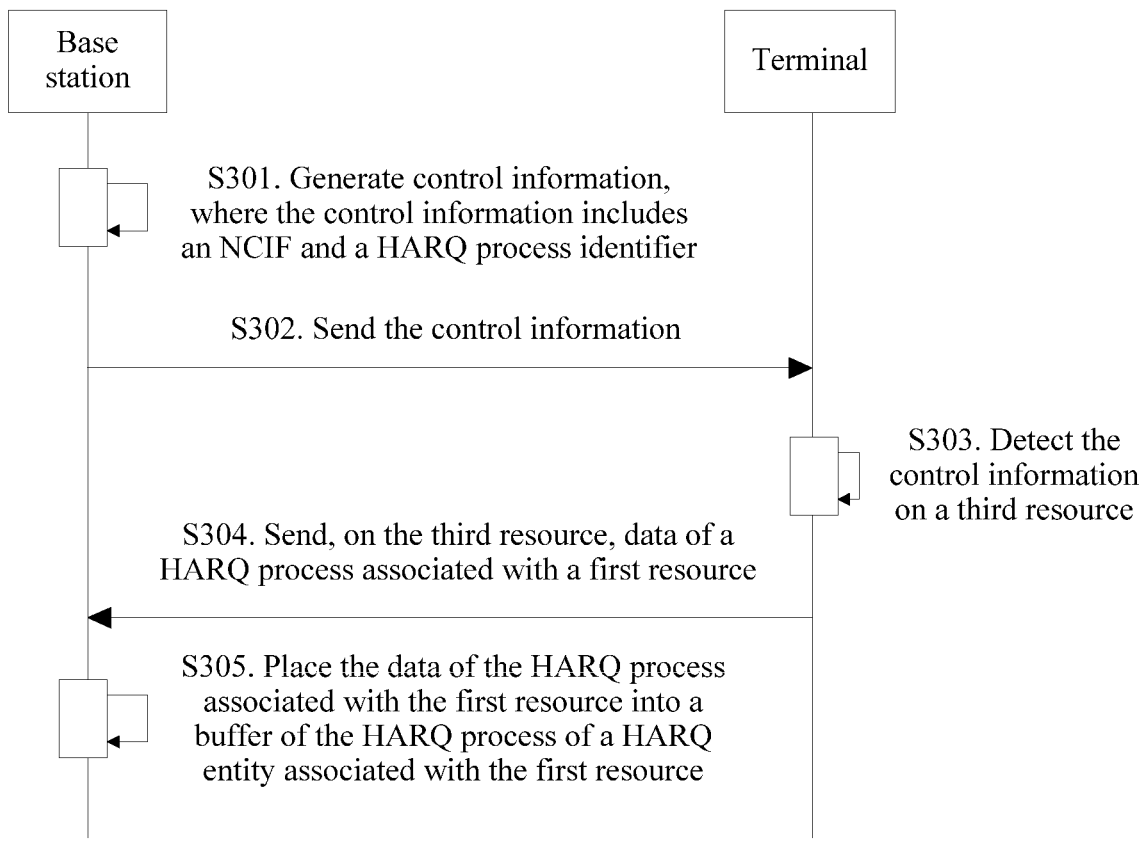
FIG. 3 is a schematic flowchart of a data processing method according to another embodiment of this application.

FIG. 3 is a schematic flowchart of a data processing method according to another embodiment of this application. In the embodiment shown in FIG. 2, the terminal places associated downlink data into the buffer of the specified HARQ process of the specified HARQ entity. The base station may perform a similar operation on uplink data. As shown in FIG. 3, the method includes the following operations.

Operation S301. A base station generates control information, where the control information includes an NCIF and a HARQ process identifier.

Operation S302. The base station sends the control information.

Operation S303. The terminal detects the control information on a third resource.

For S301 to S303, refer to S201 to S203. Details are not described herein again.

Operation S304. The terminal sends, on a second resource, data of the HARQ process associated with the first resource.

The second resource and the third resource may be a same resource, or may not be a same resource. When non-cross-resource scheduling is performed, the second resource and the third resource are the same resource. For example, if the cross-carrier scheduling is performed, the second resource and the third resource are not the same resource.

In one embodiment, the terminal detects the control information on the third resource, and the control information includes an identifier of the second resource, to be specific, the control information indicates that the second resource is scheduled by using the third resource. In this case, the terminal sends, on the second resource, data of a HARQ process associated with the first resource.

Operation S305. The base station places the data of the HARQ process associated with the first resource into the buffer of the HARQ process of the HARQ entity associated with the first resource.

In this embodiment, associated data is sent on a plurality of resources. For example, the initially transmitted data and the retransmitted data are combined in the buffer of the specified process of the specified HARQ entity, to implement combination and improve a decoding success rate.

Figure 4:
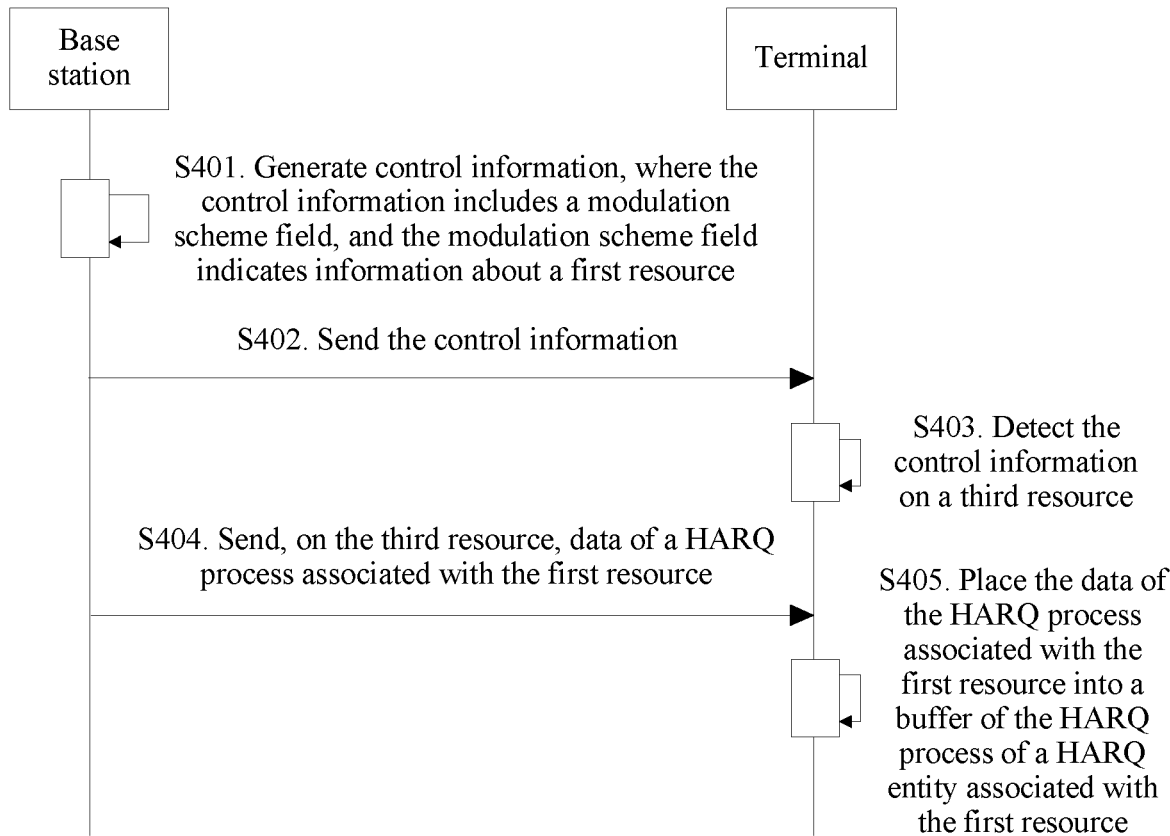
FIG. 4 is a schematic flowchart of a data processing method according to another embodiment of this application.

FIG. 4 is a schematic flowchart of a data processing method according to another embodiment of this application. A difference between this embodiment and the foregoing embodiment is that control information is different, to be specific, specific indication manners are different. That the first device is a terminal and the second device is a base station is used as an example. As shown in FIG. 4, the method includes the following operations.

Operation S401. A base station generates control information, where the control information includes a modulation scheme field, and the modulation scheme field indicates information about a first resource.

Operation S402. The base station sends the control information.

Operation S403. The terminal detects the control information on a second resource.

Operation S404. The base station sends, on a third resource, data of a HARQ process associated with the first resource.

Operation S405. The terminal places the data of the HARQ process associated with the first resource into the buffer of the HARQ process of the HARQ entity associated with the first resource.

For specific execution of the foregoing operations, refer to the embodiment shown in FIG. 2. In an uplink direction, S404 and S405 may alternatively be replaced with S304 and S305. For details, refer to the embodiment shown in FIG. 3.

Specifically, in this embodiment, the control information may be DCI. The DCI includes a HARQ process number (HARQ process ID), a new data indicator (NDI), a transport block size (TBS), and a modulation and coding scheme (MCS) field.

The HARQ process number uniquely specifies one HARQ process.

Each HARQ process stores one NDI value. The value uses one bit to indicate whether scheduled data is initially transmitted or retransmitted. In other words, the NDI is an initial transmission/retransmission indication identifier. If the NDI value of the same HARQ process changes (from 0 to 1 or from 1 to 0) compared with a previous value, it indicates that current transmission is initial transmission of a new data block, and no change indicates that the current transmission is retransmission of the same data block. For example, the terminal detects the foregoing control information on the second resource and receives data on the second resource. The foregoing control information indicates that the HARQ ID=n, and the UE compares, with the NDI in the control information, an NDI in a HARQ process n associated with the second resource. If the two NDIs are the same, the current transmission is considered as initial transmission. If the two NDIs are different, the current transmission is considered as retransmission.

A TBS during retransmission is usually unchanged, and is the same as the TBS during initial transmission.

The MCS field is a modulation scheme field, and the DCI uses a 5-bit MCS identifier (index) (0 to 31) to indicate a modulation and coding scheme used for the current transmission, and this affects selection of the TBS. There are 32 combinations for the MCS in total. Three combinations (whose indexes are 29 to 31) are reserved, and the three combinations are used only for retransmission. Because the TBS used during retransmission is the same as that used during initial transmission, for retransmission, only the MCS index needs to be used to indicate a modulation scheme, and the TBS index has no practical significance. In this embodiment, the MCS index is multiplexed to indicate the first resource.

When the NDI changes, to be specific, the NDI indicates that currently transmitted data is initially transmitted data, the MCS index still has an original function of indicating a current modulation order. If the NDI does not change, to be specific, the NDI indicates that currently transmitted data is retransmitted data, the MCS index indicates the first resource.

In one embodiment, a mapping relationship between the MCS index and a resource may be preconfigured. As shown in Table 1, that a carrier serves as a resource is used as an example. A first column of Table 1 shows the MCS index, and a fourth column shows a corresponding carrier number, and may further indicate a HARQ entity corresponding to the carrier.

TABLE 1

| MCS Index $I_{MCS}$ | Modulation order $Q_m$ | TBS Index $I_{TBS}$ | HARQ entity |
|---|---|---|---|
| 0 | 2 | 0 | CC 0 |
| 1 | 2 | 1 | CC 1 |
| 2 | 2 | 2 | CC 2 |
| 3 | 2 | 3 | CC 3 |
| 4 | 2 | 4 | CC 4 |
| 5 | 2 | 5 | CC 5 |
| 6 | 2 | 6 | CC 6 |
| 7 | 2 | 7 | CC 7 |
| 8 | 2 | 8 | |
| 9 | 2 | 9 | |
| 10 | 4 | 9 | CC 0 |
| 11 | 4 | 10 | CC 1 |
| 12 | 4 | 11 | CC 2 |
| 13 | 4 | 12 | CC 3 |
| 14 | 4 | 13 | CC 4 |
| 15 | 4 | 14 | CC 5 |
| 16 | 4 | 15 | CC 6 |
| 17 | 6 | 15 | CC 0 |
| 18 | 6 | 16 | CC 1 |
| 19 | 6 | 17 | CC 2 |
| 20 | 6 | 18 | CC 3 |
| 21 | 6 | 19 | CC 4 |
| 22 | 6 | 20 | CC 5 |
| 23 | 6 | 21 | CC 6 |
| 24 | 6 | 22 | CC 7 |
| 25 | 6 | 23 | |
| 26 | 6 | 24 | |
| 27 | 6 | 25 | |
| 28 | 6 | 26 | |
| 29 | 2 | reserved | |
| 30 | 4 | | CC 7 |
| 31 | 6 | | |

Referring to Table 1, when a modulation scheme indicated by a specific MCS index is a and the HARQ entity is CC b, it indicates that a modulation order used for current data retransmission is a, and the current data retransmission is managed by a HARQ entity of a carrier b. With reference to a HARQ process number c in the DCI, initially transmitted data and retransmitted data that are associated with the current transmission are all placed into a buffer of a process c in the HARQ entity of the carrier b.

It should be noted that, it is assumed that N carriers are configured for the terminal, the base station marks an anchor carrier as a "carrier 0", and other carriers are mapped to a carrier 1 to a carrier N−1 in ascending order of indexes (sCellIndex-r10) of the carriers. Alternatively, N carriers are configured for the terminal, but only K carriers are numbered. In one embodiment, the base station marks an anchor carrier as a "carrier 0", and selects K−1 carriers from remaining N−1 carriers to notify the terminal. The K−1 carriers are mapped to a carrier 1 to a carrier K−1 in ascending order. N is an integer greater than 0, and K is an integer greater than 0 and less than N.

The modulation scheme field includes $N_i$ values to indicate a modulation order $M_i$, and there are $\min\{N_1, N_2, L, N_i, L, N_k\}$ resource identifiers to which values of modulation scheme identifiers can be mapped. For example, Table 1 includes 11 values, namely, 0 to 9, and 29 to indicate the modulation order 2, includes 8 values, namely, 10 to 16, and 30 to indicate the modulation order 4, and includes 13 values, namely, 17 to 28, and 31 to indicate the modulation order 6. It can be learned that $N_1=11$, $N_2=8$, and $N_3=13$. Therefore, there are $\min\{N_1, N_2, N_3\}$ identifiers of resources on which mapping may be performed, and the identifiers are denoted as "CC 0 to CC 7", where $\min\{N_1, N_2, N_3\}=8$. K is an integer greater than 0, 1≤i≤k, i is an integer, and both $N_1$ and $M_i$ are integers greater than 0.

Further, in a resource aggregation scenario, cross-resource scheduling or non-cross-resource scheduling may be configured for the terminal.

Cross-resource scheduling allows a cell to schedule a resource of another cell. For example, cross-carrier scheduling allows a cell to schedule a radio resource in another cell by using a physical downlink control channel (PDCCH). In other words, the downlink control information is transmitted in a cell, but corresponding downlink data or uplink data is transmitted in another cell.

Non-cross-resource scheduling indicates that downlink control information sent in each cell is corresponding to downlink resource allocation or uplink resource allocation of the cell.

If the cross-resource scheduling is configured for the terminal, the base station informs the terminal of a specific resource for receiving the DCI. In other words, the base station informs the terminal of a resource identifier, and the terminal receives the DCI on a corresponding resource based on the resource identifier. In one embodiment, when the cross-resource scheduling is configured for the terminal, the DCI includes a resource identifier field. If the cross-carrier scheduling is configured, the resource identifier field may be a carrier indicator field (CIF), and when CIF=m, it indicates that the DCI is control information of a carrier m.

Based on the foregoing embodiment, when the second resource is a scheduling carrier, the first resource is one of a plurality of scheduled carriers.

The first resource is indicated by using a modulation scheme field, a quantity of the plurality of scheduled carriers is $\min\{N_1, N_2, L, N_i, L, N_k\}$, the modulation scheme field includes $N_i$ values to indicate a modulation order $M_i$, k is an integer greater than 0, 1≤i≤k, i is an integer, and both $N_i$ and $M_i$ are integers greater than 0.

When the carrier n performs cross-carrier scheduling on the plurality of carriers, there are a plurality of corresponding HARQ entities, and one HARQ entity is selected for management. In other words, the associated initially transmitted data and retransmitted data are placed into a buffer of a specified process of the specified HARQ entity.

It is assumed that the second carrier n schedules carriers m1, m2, and m3. When the NDI indicates that the currently transmitted data is retransmitted data, a mapping relationship between the MCS index and the HARQ entity may be shown in Table 2.

TABLE 2

| MCS Index $I_{MCS}$ | Modulation order $Q_m$ | TBS Index $I_{TBS}$ | HARQ entity |
|---|---|---|---|
| 0 | 2 | 0 | CC n |
| 1 | 2 | 1 | CC m1 |
| 2 | 2 | 2 | CC m2 |
| 3 | 2 | 3 | CC m3 |
| 4 | 2 | 4 | |
| 5 | 2 | 5 | |
| 6 | 2 | 6 | |
| 7 | 2 | 7 | |
| 8 | 2 | 8 | |
| 9 | 2 | 9 | |
| 10 | 4 | 9 | CC n |
| 11 | 4 | 10 | CC m1 |
| 12 | 4 | 11 | CC m2 |
| 13 | 4 | 12 | CC m3 |
| 14 | 4 | 13 | |
| 15 | 4 | 14 | |
| 16 | 4 | 15 | |
| 17 | 6 | 15 | CC n |
| 18 | 6 | 16 | CC m1 |

TABLE 2-continued

| MCS Index $I_{MCS}$ | Modulation order $Q_m$ | TBS Index $I_{TBS}$ | HARQ entity |
|---|---|---|---|
| 19 | 6 | 17 | CC m2 |
| 20 | 6 | 18 | CC m3 |
| 21 | 6 | 19 | |
| 22 | 6 | 20 | |
| 23 | 6 | 21 | |
| 24 | 6 | 22 | |
| 25 | 6 | 23 | |
| 26 | 6 | 24 | |
| 27 | 6 | 25 | |
| 28 | 6 | 26 | |
| 29 | 2 | reserved | |
| 30 | 4 | | |
| 31 | 6 | | |

One carrier can schedule a plurality of carriers, but one carrier can be scheduled by only one carrier. When the first resource is a scheduling carrier, the second resource is a scheduled carrier. To be specific, the first carrier schedules the second carrier, and therefore, associated data transmission may be managed by the HARQ entity corresponding to the first carrier or the second carrier.

It is assumed that the first carrier n schedules a second carrier m. When the NDI indicates that the currently transmitted data is retransmitted data, a mapping relationship between the MCS index and the HARQ entity may be shown in Table 3.

TABLE 3

| MCS Index $I_{MCS}$ | Modulation order $Q_m$ | TBS Index $I_{TBS}$ | HARQ entity |
|---|---|---|---|
| 0 | 2 | 0 | CC n |
| 1 | 2 | 1 | CC m |
| 2 | 2 | 2 | |
| 3 | 2 | 3 | |
| 4 | 2 | 4 | |
| 5 | 2 | 5 | |
| 6 | 2 | 6 | |
| 7 | 2 | 7 | |
| 8 | 2 | 8 | |
| 9 | 2 | 9 | |
| 10 | 4 | 9 | CC n |
| 11 | 4 | 10 | CC m |
| 12 | 4 | 11 | |
| 13 | 4 | 12 | |
| 14 | 4 | 13 | |
| 15 | 4 | 14 | |
| 16 | 4 | 15 | |
| 17 | 6 | 15 | CC n |
| 18 | 6 | 16 | CC m |
| 19 | 6 | 17 | |
| 20 | 6 | 18 | |
| 21 | 6 | 19 | |
| 22 | 6 | 20 | |
| 23 | 6 | 21 | |
| 24 | 6 | 22 | |
| 25 | 6 | 23 | |
| 26 | 6 | 24 | |
| 27 | 6 | 25 | |
| 28 | 6 | 26 | |
| 29 | 2 | reserved | |
| 30 | 4 | | |
| 31 | 6 | | |

Based on the foregoing embodiment, it can be learned that in this application, the second device sends the control information to indicate the information about the first resource and the information about the HARQ process, and sends, on the second resource, the data of the HARQ process associated with the first resource. The first device receives the control information. When the first device receives, on the second resource, the data associated with the control information, the first device places the data into the buffer of the specified process of the HARQ entity associated with the first resource, to implement resource aggregation.

Figure 5:
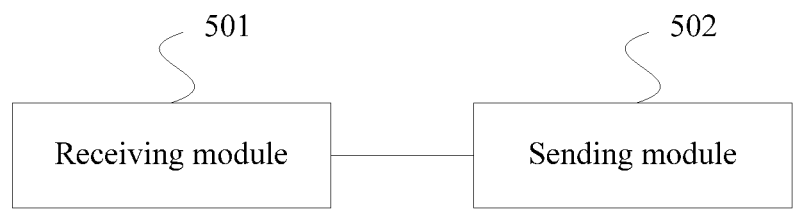
FIG. 5 is a schematic structural diagram of a data processing apparatus according to an embodiment of this application.

FIG. 5 is a schematic structural diagram of a data processing apparatus according to an embodiment of this application. The apparatus may be integrated into the foregoing first device. In one embodiment, the apparatus includes a receiving module 501 and a sending module 502.

The receiving module 501 is configured to receive control information, where the control information includes information about a first resource and information about a HARQ process.

The sending module 502 is configured to send, on a second resource, data of the HARQ process associated with the first resource.

Figure 6:
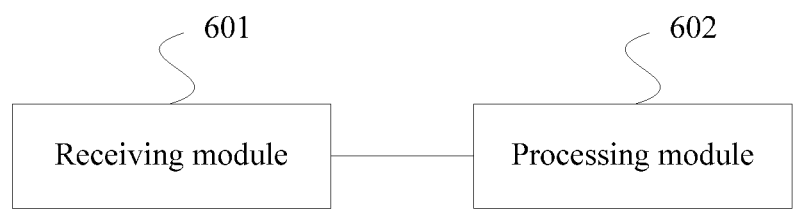
FIG. 6 is a schematic structural diagram of a data processing apparatus according to another embodiment of this application.

FIG. 6 is a schematic structural diagram of a data processing apparatus according to another embodiment of this application. The apparatus may be integrated into the foregoing first device. In one embodiment, the apparatus includes a receiving module 601 and a processing module 602.

The receiving module 601 is configured to: receive control information, where the control information includes information about a first resource and information about a HARQ process; and receive, on a second resource, data associated with the control information.

The processing module 602 is configured to place the data into a buffer of a HARQ process of a HARQ entity associated with the first resource.

Figure 7:
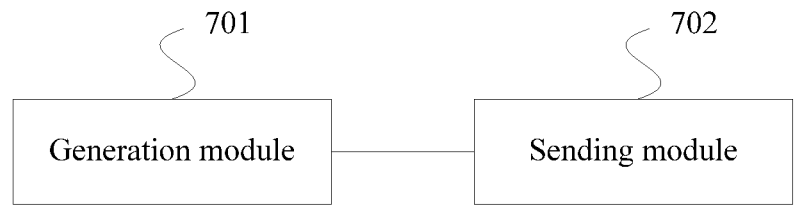
FIG. 7 is a schematic structural diagram of a data processing apparatus according to another embodiment of this application.

FIG. 7 is a schematic structural diagram of a data processing apparatus according to another embodiment of this application. The apparatus may be integrated into the foregoing second device. In one embodiment, the apparatus includes a generation module 701 and a sending module 702.

The generation module 701 is configured to generate control information, where the control information includes information about a first resource and information about a HARQ process.

The sending module 702 is configured to send the control information.

Figure 8:
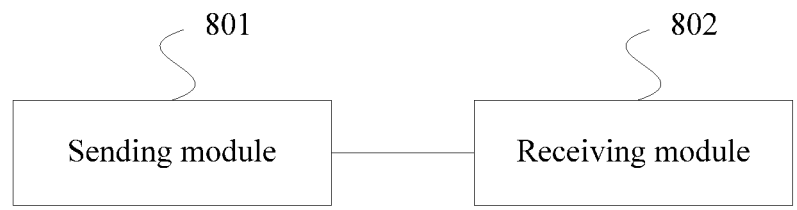
FIG. 8 is a schematic structural diagram of a data processing apparatus according to another embodiment of this application.

FIG. 8 is a schematic structural diagram of a data processing apparatus according to another embodiment of this application. The apparatus may be integrated into the foregoing second device. In one embodiment, the apparatus includes a sending module 801 and a receiving module 802.

The sending module 801 is configured to send control information, where the control information includes information about a first resource and information about a hybrid automatic repeat request HARQ process.

The receiving module 802 is configured to receive, on a second resource, data of the HARQ process associated with the first resource.

Based on the embodiments shown in FIG. 5 to FIG. 8, In one embodiment, the information about the first resource is an identifier of a HARQ entity associated with the first resource.

In one embodiment, the information about the first resource is an identifier of the first resource.

In one embodiment, the control information includes a modulation scheme field, and the modulation scheme field is used to indicate the information about the first resource.

In one embodiment, the control information includes an initial transmission/retransmission indication identifier, and the initial transmission/retransmission indication identifier is used to indicate whether currently transmitted data is retransmitted data or initially transmitted data.

When the initial transmission/retransmission indication identifier indicates that the currently transmitted data is the retransmitted data, the modulation scheme field indicates the first resource by using a mapping relationship between a modulation scheme and a resource.

In one embodiment, when the second resource is a scheduling carrier, the first resource is one of a plurality of scheduled carriers.

In one embodiment, when the second resource is a scheduled carrier, the first resource is a scheduling carrier.

In one embodiment, a quantity of the plurality of scheduled carriers is $\min\{N_1, N_2, L, N_i, L, N_k\}$, the modulation scheme field includes $N_i$ values to indicate a modulation order $M_i$, k is an integer greater than 0, $1 \leq i \leq k$, i is an integer, and both $N_i$ and $M_i$ are integers greater than 0.

The apparatuses provided in FIG. 5 to FIG. 8 are configured to execute the foregoing methods. A specific implementation and technical effect are similar, and details are not described herein again.

It should be noted that the foregoing division of modules of the apparatus is merely logical function division, and during actual implementation, some or all modules may be integrated into one physical entity, or the modules may be physically separated. In addition, all the modules may be implemented by invoking software by a processing element; or all the modules may be implemented by hardware; or some modules may be implemented by invoking software by a processing element, and some modules may be implemented by hardware. For example, the determining module may be an independently disposed processing element, or may be integrated into a chip of the foregoing apparatus for implementation. In addition, the determining module may alternatively be stored in a memory of the foregoing apparatus in a form of program code, and is invoked by a processing element of the foregoing apparatus, to execute the foregoing functions of the determining module. Implementation of other modules is similar to this. In addition, all or some of the modules may be integrated, or may be implemented independently. The processing element may be an integrated circuit and has a signal processing capability. In an implementation process, operations in the foregoing methods or the foregoing modules can be implemented by using a hardware integrated logic circuit in the processing element, or by using instructions in a form of software.

For example, the foregoing modules may be configured as one or more integrated circuits that implement the foregoing methods, such as one or more application-specific integrated circuits (ASIC), one or more microprocessors (digital signal processor, DSP), or one or more field programmable gate arrays (FPGA). For another example, when one of the foregoing modules is implemented by invoking program code by the processing element, the processing element may be a general-purpose processor, such as a central processing unit (CPU), or another processor that can invoke the program code. For still another example, these modules may be integrated together and implemented in a system-on-a-chip (SOC) form.

Figure 9:
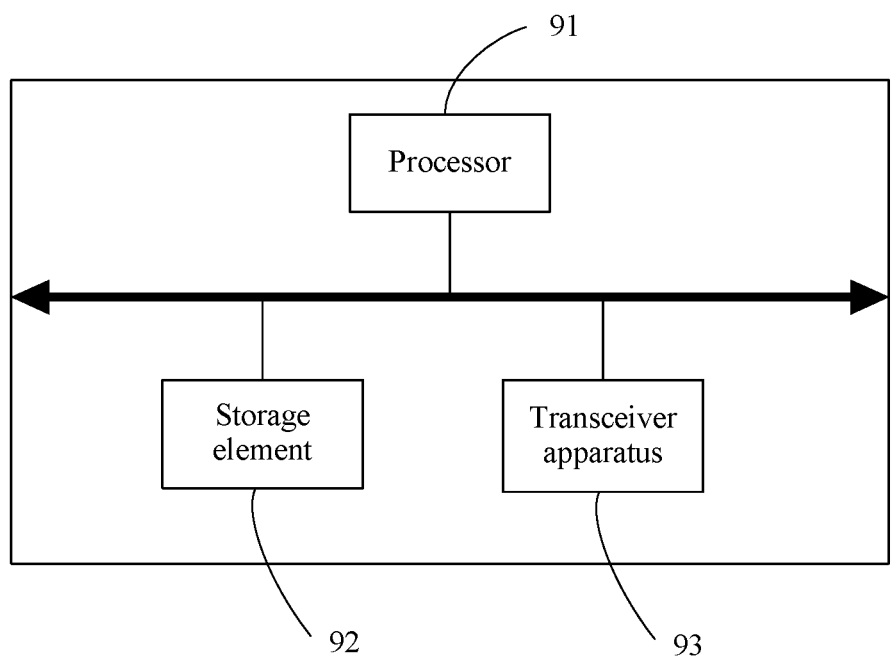
FIG. 9 is a schematic structural diagram of a data processing apparatus according to another embodiment of this application.

FIG. 9 is a schematic structural diagram of a data processing apparatus according to another embodiment of this application. The apparatus may be integrated into the foregoing first device. In one embodiment, the apparatus includes a processor 91, a storage element 92, and a transceiver apparatus 93.

The transceiver apparatus 93 may be connected to an antenna. In a downlink direction, the transceiver apparatus 93 receives, by using the antenna, information sent by the second device, and sends the information to the processor 91 for processing. In an uplink direction, the processor 91 processes data of the apparatus, and sends the data to the second device by using the transceiver apparatus 93.

The storage element 92 is configured to store program code used to implement the foregoing method embodiment or each module in the embodiments shown in FIG. 5 and FIG. 6. The processor 91 invokes the program code to perform operations in the foregoing method embodiment, to implement each module in the embodiments shown in FIG. 5 and FIG. 6.

Alternatively, some or all of the foregoing units may be embedded on a chip of the terminal in a form of a field programmable gate array (FPGA) for implementation. The units may be implemented separately or may be integrated together.

The processing element herein is similar to that described above, and may be a general-purpose processor, such as a CPU, or may be configured as one or more integrated circuits that implement the foregoing methods, such as one or more application-specific integrated circuits (ASIC), one or more microprocessors (digital signal processor, DSP), or one or more field programmable gate arrays (FPGA). The storage element may be one storage apparatus or may be a general term of a plurality of storage elements.

In addition, a plurality of interfaces may be provided on the processor, and are configured to be connected to a peripheral device or an interface circuit that is connected to a peripheral device. For example, the interfaces are configured to be connected to an interface of a display screen, an interface of a camera, an interface of an audio processing element, and the like.

Figure 10:
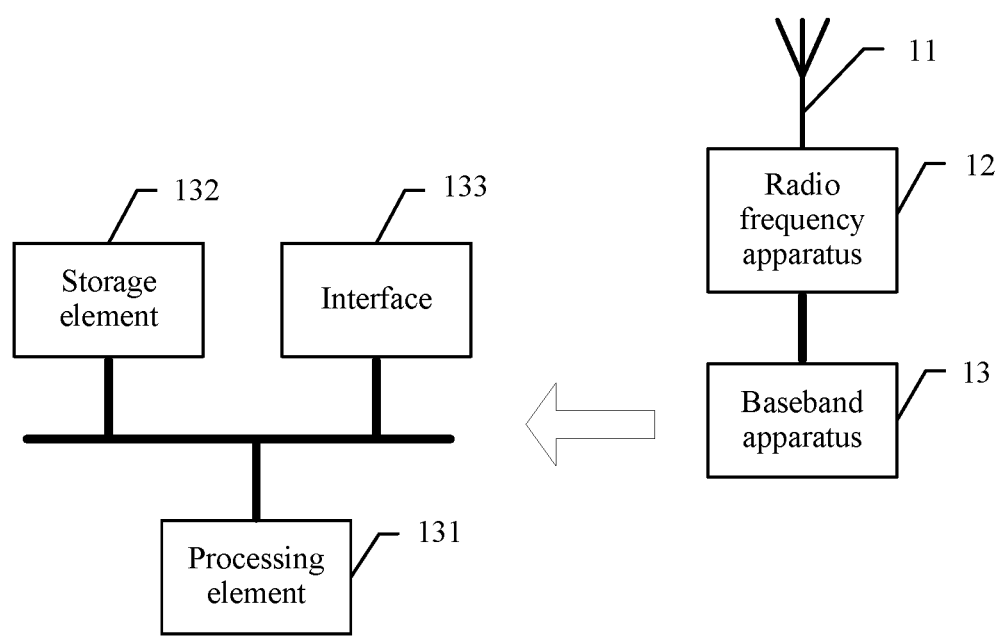
FIG. 10 is a schematic structural diagram of a data processing apparatus according to another embodiment of this application.

FIG. 10 is a schematic structural diagram of a data processing apparatus according to another embodiment of this application. The apparatus may be integrated into the foregoing second device. In one embodiment, the apparatus includes an antenna 11, a radio frequency apparatus 12, and a baseband apparatus 13. The antenna 11 is connected to the radio frequency apparatus 12. In an uplink direction, the radio frequency apparatus 12 receives information by using the antenna 11, and sends the received information to the baseband apparatus 13 for processing. In a downlink direction, the baseband apparatus 13 processes information that needs to be sent, and sends processed information to the radio frequency apparatus 12. The radio frequency apparatus 12 processes the received information, and sends processed information by using the antenna 11.

The foregoing frequency band processing apparatus may be located in the baseband apparatus 13, and the method provided in the foregoing embodiments may be implemented in the baseband apparatus 13. The baseband apparatus 13 includes a processing element 131 and a storage element 132. For example, the baseband apparatus 13 may include at least one baseband processing board. A plurality of chips are disposed on the baseband processing board. As shown in FIG. 10, for example, one of the chips is the processing element 131 and is connected to the storage element 132, to invoke a program in the storage element 132, so as to execute an operation shown in the foregoing method embodiments.

The baseband apparatus 13 may further include an interface 133, configured to exchange information with the radio frequency apparatus 12. For example, the interface is a common public radio interface (CPRI).

Herein, the processing element may be one processor, or may be a general term of a plurality of processing elements.

For example, the processing element may be a CPU or an ASIC, or may be configured as one or more integrated circuits that implement the foregoing method, such as one or more microprocessors DSPs, or one or more field programmable gate arrays FPGAs. The storage element may be a memory, or may be a general term of a plurality of storage elements.

An embodiment of this application further provides a data processing apparatus. The apparatus includes a processor, configured to: be coupled to a memory, read an instruction in the memory, and execute the instruction to implement the method according to any one of the foregoing embodiments. In one embodiment, the apparatus may further include the memory. In one embodiment, the data processing apparatus may be an integrated circuit, a chip system, or a chip.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A data processing method, comprising:
receiving, by a first device, a first control information and a second control information, wherein each of the first control information and the second control information comprises a modulation scheme field that indicates information about a first resource, information about a hybrid automatic repeat request (HARQ) process associated with the first resource, and an indication identifier for indicating whether currently transmitted data of the HARQ process is initially transmitted data or retransmitted data, wherein the first resource is indicated using a multiplexed modulation and coding scheme (MCS) index;
receiving, by the first device from a second device on a plurality of resources, a first packet on an initial transmission of the data of the HARQ process and a second packet on a retransmission of the data, wherein the plurality of resources includes a second resource, which is a scheduling carrier, wherein the first resource is one of a plurality of scheduled carriers, wherein a quantity of the plurality of scheduled carriers is min$\{N_1, N_2, \ldots, N_i, \ldots, N_k\}$, wherein the modulation scheme field includes $N_i$ values to indicate a modulation order $M_i$, wherein k is an integer greater than 0, $1 \leq i \leq k$, i is an integer, and both $N_i$ and $M_i$ are integers greater than 0; and
placing, by the first device, the first packet and the second packet into a buffer of the HARQ process, wherein the first packet and the second packet are to be combined.

2. The method according to claim 1, wherein the information about the HARQ process is an identifier of a HARQ entity associated with the first resource.

3. The method according to claim 1, wherein the information about the first resource is an identifier of the first resource.

4. The method according to claim 1, wherein
when the indication identifier indicates that currently transmitted data is retransmitted data, the modulation scheme field indicates the first resource by using a mapping relationship between a modulation scheme and one of the first resource or the second resource.

5. The method according to claim 1, wherein the plurality of resources includes a second resource; and when the second resource is a scheduled carrier, the first resource is a scheduling carrier.

6. An apparatus, comprising:
a non-transitory memory storage storing instructions; and
one or more processors coupled with the non-transitory memory storage, wherein the instructions, when executed by the one or more processors, cause the one or more processors to:
receive a first control information and a second control information, wherein each of the first control information and the second control information comprises a modulation scheme field that indicates information about a first resource, information about a hybrid automatic repeat request (HARQ) process associated with the first resource, and an indication identifier for indicating whether currently transmitted data of the HARQ process is initially transmitted data or retransmitted data, wherein the first resource is indicated using a multiplexed modulation and coding scheme (MCS) index, wherein a plurality of resources includes a second resource, which is a scheduling carrier, wherein the first resource is one of a plurality of scheduled carriers, and wherein a quantity of the plurality of scheduled carriers is min$\{N_1, N_2, \ldots, N_i, \ldots, N_k\}$, wherein the modulation scheme field includes $N_i$ values to indicate a modulation order $M_i$, wherein k is an integer greater than 0, $1 \leq i \leq k$, i is an integer, and both and $N_i$ and $M_i$ are integers greater than 0,
receive a first packet on an initial transmission of the data of the HARQ process, and a second packet on a retransmission of the data;
place the first packet and the second packet into a buffer of the HARQ process, wherein the first packet and the second packet are to be combined.

7. An apparatus, comprising:
a non-transitory memory storage storing instructions; and
one or more processors coupled with the non-transitory memory storage, wherein the instructions, when executed by the one or more processors, cause the one or more processors to:
generate a first control information and a second control information, wherein each of the first control information and the second control information comprises a modulation scheme field that indicates information about a first resource and information about a hybrid automatic repeat request (HARQ) process associated with the first resource, and an indication identifier for whether currently transmitted data of the HARQ process is initially transmitted data or retransmitted data, wherein the first resource is indicated using a multiplexed modulation and coding scheme (MCS) index,
send the first control information and the second control information to another apparatus, wherein a plurality of resources includes a second resource, which is a scheduling carrier, wherein the first resource is one of a plurality of scheduled carriers, wherein a quantity of the plurality of scheduled carriers is min$\{N_1, N_2, \ldots, N_i, \ldots, N_k\}$, wherein the modulation scheme field includes $N_i$ values to indicate a modulation order $M_i$, wherein k is an integer greater than 0, $1 \leq i \leq k$, i is an integer, and both $N_i$ and $M_i$ are integers greater than 0, receive, on the plurality of resources, a first packet on an initial transmission of data of the HARQ process and a second packet on a retransmission of the data, and place the first packet and the second packet into a buffer of the HARQ process, wherein the first packet and the second packet are to be combined.

8. The apparatus according to claim 6, wherein the information about the HARQ process is an identifier of a HARQ entity associated with the first resource.

9. The apparatus according to claim 6, wherein the information about the first resource is an identifier of the first resource.

10. The apparatus according to claim 7, wherein
when the indication identifier indicates that the currently transmitted data is the retransmitted data, the modulation scheme field indicates the first resource by using a mapping relationship between a modulation scheme and one of the first resource or the second resource.

11. The apparatus according to claim 6, wherein when the second resource is a scheduled carrier, the first resource is a scheduling carrier.

12. The apparatus according to claim 7, wherein when the second resource is a scheduled carrier, the first resource is a scheduling carrier.

\* \* \* \* \*